April 23, 1929.   P. BÖTTCHER   1,709,835
MACHINE FOR CUTTING DOUBLE HELICAL OR DOUBLE SPIRAL GEARS
Original Filed July 31, 1925   2 Sheets-Sheet 1
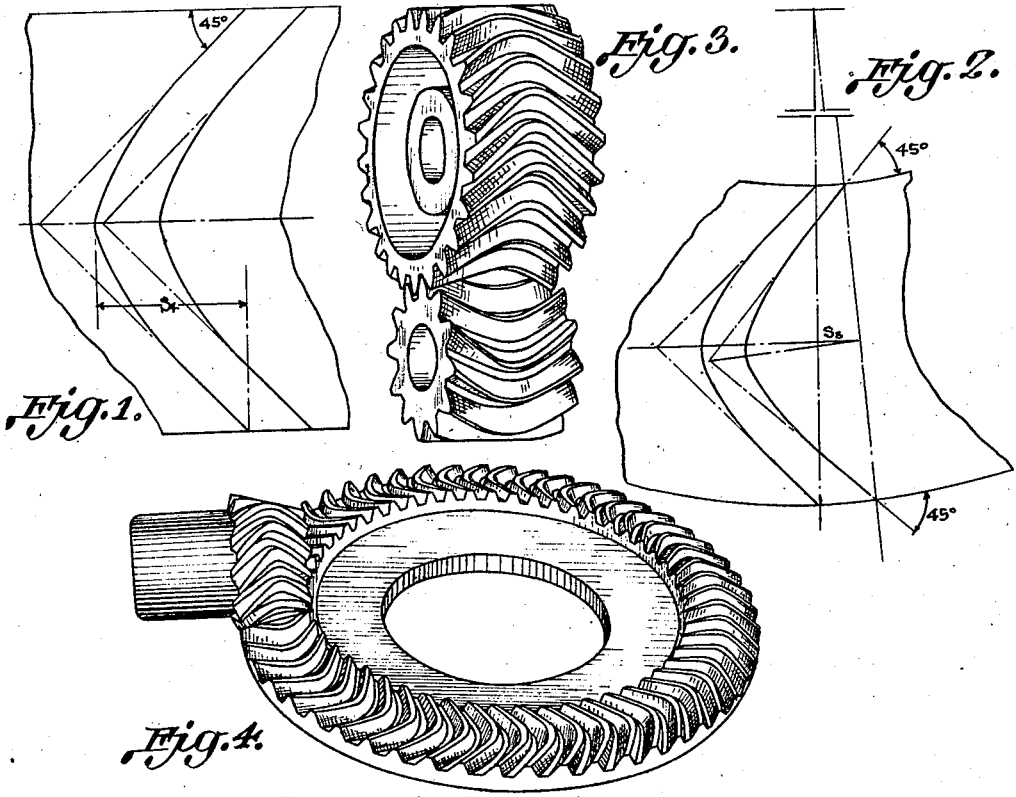
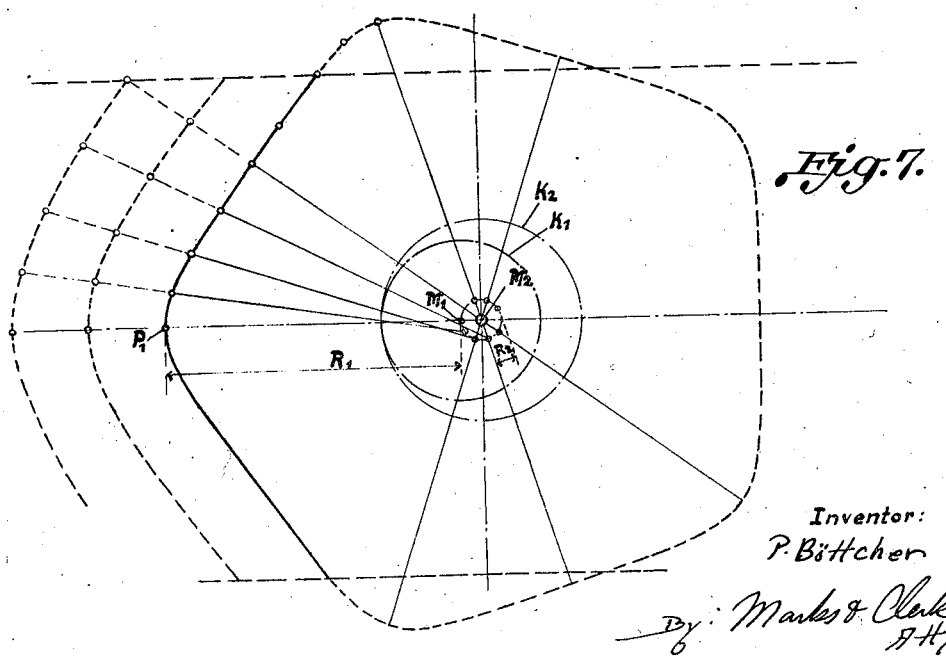
Inventor:
P. Böttcher
By: Marks & Clerk
Attys.

April 23, 1929.  P. BÖTTCHER  1,709,835
MACHINE FOR CUTTING DOUBLE HELICAL OR DOUBLE SPIRAL GEARS
Original Filed July 31, 1925  2 Sheets-Sheet 2

Inventor:
P. Böttcher
By: Marks & Clerk
Attys.

Patented Apr. 23, 1929.

1,709,835

UNITED STATES PATENT OFFICE.

PAUL BÖTTCHER, OF ALTONA-BAHRENFELD, NEAR HAMBURG, GERMANY.

MACHINE FOR CUTTING DOUBLE-HELICAL OR DOUBLE-SPIRAL GEARS.

Original application filed July 31, 1925, Serial No. 47,355, and in Germany September 12, 1924. Divided and this application filed October 25, 1926. Serial No. 144,086.

This invention relates to the manufacture of double helical or double spiral gears, sometimes referred to as herringbone gears, including cylindrical and bevel pinions and wheels, the object being to produce teeth for such gears having a new and efficient configuration, and also to facilitate the manufacture thereof.

The high efficiency and practical advantages of herringbone gears are well known in the art both as regards cylindrical and bevel gears, including wheels and pinions. It is obvious that maximum efficiency can only be obtained if the two inclined branches of each tooth merge into each other, that is to say, they are continuous. In the theoretically true herringbone tooth a sharp corner occurs at the junction of the two branches of the tooth but this presents difficulties in practice and frequently the corner is rounded off by a subsequent or secondary operation.

When herringbone gears are cut from blanks according to the profiled end mill system the teeth so formed have the defect that the two branches of each tooth do not intersect sharply as the radius of the end mill results in a corresponding rounding on the concave side at the junction and, in order to ensure accurate meshing of this rounded portion with the corresponding point or apex of the teeth of a fellow wheel, it is necessary in a subsequent operation to round the apex or convex side of the junction to correspond.

As a profiled end mill does not produce a correct profile for this rounded portion at the junction this part cannot participate in the transmission of power, so that the effective width of the tooth is diminished.

A herringbone tooth formed by an end mill, therefore, comprises two inclined branches united by a small circular arcuate portion, corresponding to the radius of the end mill, so that the herringbone formation is to some extent curved, but it does not have a bearing surface at the curved portion. In order to avoid the above defects it has been proposed to substitute circular arcuate teeth for the herringbone teeth. If a tooth of this form be arranged symmetrically in relation to the median plane of the wheel it is not built up as it were from two difficultly united branches and can be machine cut in a continuous operation. Such teeth therefore present no serious difficulties in machining according to the modern generating methods, and moreover each tooth presents a bearing surface throughout the entire width of the wheel, avoiding any inconvenient corners. Such teeth, like the herringbone teeth, also ensure gradual transmission of power without setting up axial pressure.

In comparison with the herringbone teeth, other conditions being equal, the circular arcuate teeth have the disadvantage of a much reduced overlap owing to their very slight inclination to the median plane of the wheel, what inclination there is increasing gradually towards the edges of the wheel rim and resulting in a comparatively small overlap for the entire tooth. Such wheels therefore are usually made broader than herringbone toothed wheels for the same conditions.

The object of the present invention therefore is to obtain a configuration of tooth intermediate in some respects of the two configurations above discussed, which will retain advantages of the circular arcuate teeth essentially the easy and accurate machining of them by generating while substantially eliminating their disadvantages, particularly as regards overlap.

The fundamental principle of a continuous curve is retained, but is modified or adapted, that is the simple circular arc of uniform curvature throughout is replaced by a curve which approaches more nearly to the herringbone configuration, and is therefore much more efficient. For example: by shaping the tooth according to a hypocycloid it is possible to generate a tooth of a form similar to the parabolic form.

The unitary connection of the parts of the whole tooth on a continuous curve is therefore maintained, while the overlap is considerably increased in comparison with the circular arcuate tooth.

Several embodiments of the invention will now be described by way of example with reference to the accompanying drawings, but it is to be understood that the invention is not restricted to the particular details described and shown by way of illustrating the principles underlying the invention.

In the drawings:—

Figure 1 is a developed section or diagram of one form of gear tooth according to the invention.

The developed sectional mode of illustration is adopted as the outlines shown are assumed to be produced by the molding or cutter generating process wherein the cutting edge of the tool is moved in the plane (in which the sections are assumed to be developed) in order to cut or carve out the desired shape of tooth from a blank rotated or rolled in this plane, as will be clear to those skilled in the art of gear cutting, the outlines shown in the figures defining the flanks of the teeth in this plane, representing at the same time the path of the cutting edge when producing the teeth by the generating process.

Figure 2 is a developed section of one form of tooth according to the invention suitable for a bevel wheel.

Figure 3 is a perspective view illustrating two double helical gears according to the invention.

Figure 4 is a perspective view illustrating one form of double helical bevel pinion and bevel wheel according to the invention.

Figure 7 is a diagram showing the locus or curve of the cutting edge of the tool.

Figure 5:
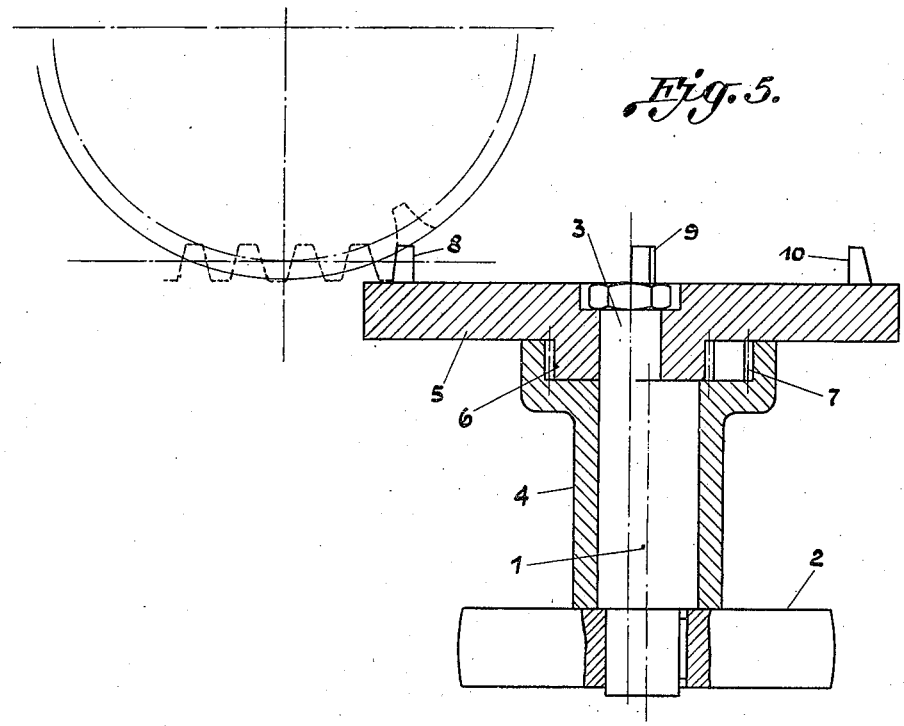
Figure 5 is a side elevation partly in section of the cutting tool and the work.
Figure 6:
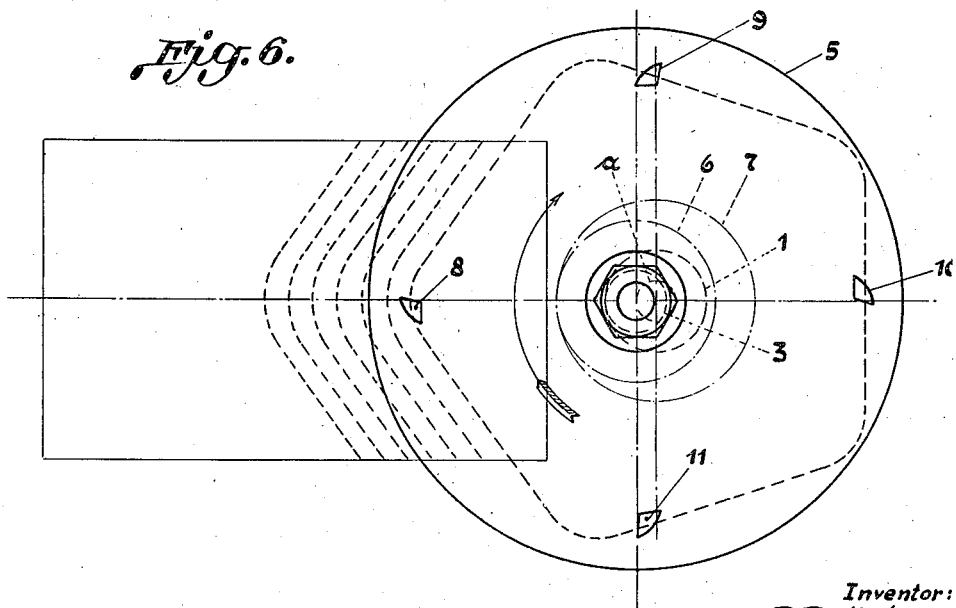
Figure 6 is a top plan view of Figure 5.

In practice of gear cutting such curves are preferred which present the least difficulties to produce by mechanical means according to the modern generating methods of gear cutting.

The majority of generating gear cutting machines now in use for cutting helical or spiral gears comprise a tool carrier which is so arranged as to cause one or more obliquely arranged cutting edges to move along paths corresponding to the required profile of the tooth of an imaginary rack (or in the case of bevel wheels the required profile of a tooth of a crown wheel, namely, one having rectilinear teeth) the helical or spiral paths for the tools being generated by the setting up of a certain relative motion between the blank and cutter, usually by rotating the blank about its axis simultaneously with the movement of the tool carrier. The profile of the teeth produced with machines of this kind is therefore dependent upon the cutting movement of the cutting edge of the tool being generated from the teeth of a rack or of a crown wheel as a basis.

A tool carrier and its operation will be hereinafter described by way of example adapted to move one or more obliquely set cutting edges in such a manner as to produce a curve of the kind above described, in accordance with the generating method. This movement may be produced in different ways, for instance by the use of suitable templets adapted to influence or modify the cutting movement of the cutting edges. Devices may be used however which are so constructed as to produce a cutting movement along the desired curve by the combination of several simple motions, for instance rectilinear or rotary motions without necessitating the use of templets. This method is also adaptable to various combinations, inasmuch as with this method the exact shape of the curve is not sharply prescribed, but is subject to variation within the limits hereinbefore indicated with the object in view. Thus, a plurality of motions derived from a simple rotary motion and oscillating on a straight line or on a circular arc may be combined with one another or with simple rotary motions. Further, a plurality of simple rotary motions may be combined to produce the desired cutting movement. In such a method of operating, several simple motions are utilized to cause the cutter to follow a curve of the kind above described opposite to the wheel blank, each participating in one of the motions.

The various possible constructions, however, do not per se constitute the subject of the invention, and the description of one example of tool carrier will therefore be sufficient to illustrate the idea of the invention.

A comparatively simple solution of the problem is the production of the cutting movement by the compounding of two simultaneously acting rotary motions. If two rotary motions about different axes are simultaneously imparted to the carrier of the cutting tools, it will perform a planetary movement. A tool carrier of this kind having a planetary movement in place of the simple, rectilinear or rotary movement, and its position in relation to the wheel blank is shown diagrammatically in Figure 8 partly in section, and in Figure 9 in plan.

The main shaft 1 is provided at one of its ends with a driving pulley 2, and with a crank pin 3 at its other end, and is journaled in a frame 4. A tool carrier 5 having a gear wheel 6 is rotatably mounted on the crank pin 3. One end of the frame 4 is extended to form a stationary internal gear wheel 7 meshing with the gear wheel 6 of the tool carrier 5. Four cutting tools 8, 9, 10 and 11 having straight flanks and corresponding to the profile of the half tooth of a rack are provided on the tool carrier 5, the tools being arranged in diametrically opposed pairs and all equidistant from the centre of crank pin 3. Upon rotating the main shaft 1 by the pulley 2 the axis of the crank pin 3 will describe a small circle $a$ with the radius of its eccentricity. The tool carrier 5 which is rotatably mounted upon the pin 3 will take part in this rotation of the main shaft 1, while, however, at the same time rotating in the opposite direction about the crank pin 3 in consequence of the revolution of its gear wheel 6 on the stationary internal gear wheel 7 resulting in a planetary movement of the tool carrier 5.

The locus or curve described as a result of this movement by the cutting edge is shown in Figure 10. The two gear wheels 6 and 7 shown in Figures 8 and 9 and rolling one within the other are indicated by the circles $K_1$ and $K_2$ in Figure 10. The path described by each cutting edge corresponds to the locus of a point $P_1$ connected to the rolling circle $K_1$ at a distance $R_1$ from the centre of the circle $K_1$. The rolling circle $K_1$ is assumed to roll in the relatively stationary circle $K_2$ without sliding relatively thereto. The centre $M_1$ of the rolling circle $K_1$ will thereby be caused to describe a circle of the radius $R_2$ around the centre $M_2$ of the stationary circle $K_2$. The point $P_1$ will describe a continuous hypocycloid.

Provided the diameters of the circles $K_1$ and $K_2$ bear the ratio to each other of 4:5, the point $P_1$ will describe a hypocycloid by the rolling of the circle $K_1$ within the circle $K_2$, which hypocycloid will possess the shape of a rounded pentagon. The section of this pentagon which is shown in full lines is of the desired substantially parabolic or herringbone shape and in the same manner as a circular arc it may be used directly as the fundamental form developed in a plane, for the novel form of herringbone teeth according to this invention.

The exact shape of the prolonged hypocycloid produced is determined by a corresponding selection of the proportions of dimensions between the values $R_1$, $K_1$ and $K_2$.

In the operation of such tools it is immaterial whether the single movements are effected continuously in the same direction of rotation or only a sufficient part of the curve is described in the generation of the tooth and then a reversal in the direction of movement is effected so that the cutting tool reciprocates or oscillates along the curve of the tooth like a planing machine.

Similar results, that is to say, cutting movements along curves, similar to parabolas may also be obtained, however, by means of other tool carriers of different construction and it should be understood that the invention does not refer to the particular details of constructions of machines of the kind referred to which have merely been discussed with reference to an embodiment of the principles of the invention by way of example and as an illustration of the facility of manufacture of the subject matter of the invention, the invention referring in its broad aspects to the method or process of manufacturing the new shape of herringbone teeth.

It is to be understood that the invention is not restricted to details of construction and arrangement of parts except as may result from the terms of the claims hereunto appended.

I claim:

1. In a method of cutting the teeth of a herringbone toothed wheel of the cylindrical or bevel wheel type by moving a cutter along the flanks of the teeth of a rack or of a crown wheel and generating the helical formation by a relative generating movement between the blank and the tool holder, imparting to the tool a cutting movement along a curve of approximately parabolic form by imparting to the cutting tool two simultaneously acting simple rotary motions about different axes adapted to impart a planetary cutting movement along an epi-trochoid of substantially parabolic form.

2. The method of cutting the teeth of a herringbone toothed wheel of the cylindrical or bevel wheel type by moving a cutter along the flanks of the teeth of a rack or of a crown wheel and generating the helical formation by a relative generating movement between the blank and the tool holder, said relative movement being the resultant of the movement of the cutting tool about two spaced axes, said rotary movements being continuous and in the same direction.

The foregoing specification signed at Hamburg, this eighth day of October, 1926.

PAUL BÖTTCHER.